Patented Jan. 26, 1943

2,309,150

UNITED STATES PATENT OFFICE 2,309,150

β-p-METHOXYPHENYLPROPYL METHYLAMINE

Eugene H. Woodruff, Kalamazoo, Mich., assignor to The Upjohn Company, Kalamazoo, Mich.

No Drawing. Application June 20, 1940, Serial No. 341,470

1 Claim. (Cl. 260—570.8)

This invention relates to improvements in β-p-methoxyphenylpropyl methylamine.

This invention relates to a new and useful product which is physiologically active for the treatment of asthma and the like. The product is particularly useful because it has a high bronchodilator effect with pressor effect so low that in therapeutic doses it is practically nil.

The objects of this invention are:

First, to produce a new and useful product.

Second, to produce such a product physiologically active as a therapeutic agent for treating asthma which has a very high bronchodilator effect and which has a practically negligible pressor effect.

Third, to provide such a substance of low toxicity.

Fourth, to produce such a product which may be administered orally.

Further objects and advantages will appear from the description to follow. The invention is pointed out in the claim.

My new product may be termed β-p-methoxyphenylpropyl methylamine. Its structural formula is:

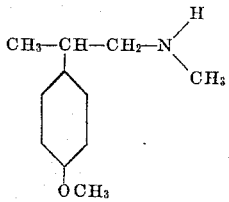

It may be prepared as follows:

33.0 grams (0.2 mole) β-p-methoxyphenyl-propylamine was refluxed with 21.2 grams (0.2 mole) benzaldehyde and 50 cc. of absolute alcohol for thirty minutes. The alcohol and water were removed and the residue distilled in vacuo. B. P. 213° C. at 12 mm. Hg. Yield 95 per cent.

15.3 grams (0.06 mole) β-p-methoxyphenyl-propyl benzalamine were placed in a thoroughly dry Carius tube with 8.5 grams (0.06 mole) methyl iodide and heated at 100° C. for six hours.

After opening the tube, the contents were washed out with 100 cc. of methyl alcohol containing 12.5 cc. distilled water. The solution was then steam distilled to remove the alcohol and benzaldehyde. Upon cooling 6 cc. glacial acetic acid was added and the solution extracted three times with ether, after which it was basified with 30 per cent sodium hydroxide solution. The resulting oil was extracted with ether, the etheral solution dried with anhydrous magnesium sulfate, the ether removed and the residue distilled. B. P. 127–128° C. at 12 mm. Hg. Yield 8.6 grams or 75 per cent of theoretical. The hydrochloride, prepared from dry hydrogen chloride and an absolute etheral solution of the amine, melts at 166.5–167.5° C. corr.

This product is particularly useful for treating asthma or the like because of its significant bronchodilator effect and low pressor effect which is substantially negligible in therapeutic doses. The pressor effect is $\frac{1}{1073}$ that of epinephrine and is of short duration. The bronchodilator effect is $\frac{1}{50}$ that of epinephrine and is regular and persistent in its action. The toxicity of the compound is such that 40 mg. per kilo body weight will kill 50 per cent of the rats when the product is injected intravenously.

The low and fleeting pressor effect is particularly significant because when the product is used therapeutically the side reactions such as nervousness, insomnia and heart disturbances are eliminated. The product is particularly useful because of the prolonged bronchodilator effect which is much longer than epinephrine. The free amine or its salts may be used. Salts of inorganic mineral acids such as sulfuric and phosphoric acids—salts of organic carboxylic acids such as acetic, oleic, stearic and palmitic acids may be used. Salts of such weak acids as carbonic may also be employed.

This amine may also be prepared by reacting β-p-methoxyphenylpropylamine with benzaldehyde and then reducing the compound and reacting the resulting β-p-methoxyphenylpropyl benzyl amine with formaldehyde and reducing the product with hydrogen and a catalyst such as Raney nickel, as described in my application filed with this application.

Having thus described my invention, what I claim as new and desire to secure by Letters Patent is:

A physiologically active therapeutic agent capable of producing bronchodilator effects comprising essentially a β-p-methoxyphenylpropyl methylamine of the group consisting of β-p-methoxyphenylpropyl methylamine and salts thereof.

EUGENE H. WOODRUFF.